(12) United States Patent
Matsuo et al.

(10) Patent No.: US 6,212,409 B1
(45) Date of Patent: Apr. 3, 2001

(54) MULTIFUNCTION EARPHONE-MICROPHONE DEVICE

(75) Inventors: Manabu Matsuo; Masaki Hoshino, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/059,452

(22) Filed: Apr. 13, 1998

(30) Foreign Application Priority Data

Apr. 14, 1997 (JP) .................................................... 9-095950

(51) Int. Cl.⁷ ........................................................ H04B 1/38
(52) U.S. Cl. ............................ 455/566; 455/568; 455/569
(58) Field of Search .................................... 455/550, 566, 455/568, 569, 575, 90; 381/26, 74, 122, 301, 306, 309, 311, 334

(56) References Cited

U.S. PATENT DOCUMENTS

| | | | |
|---|---|---|---|
| 5,487,182 | * | 1/1996 | Hasson .................................. 455/569 |
| 5,703,947 | * | 12/1997 | Hino et al. ............................ 455/575 |
| 5,832,390 | * | 11/1998 | Irvin ..................................... 455/575 |

FOREIGN PATENT DOCUMENTS

| | | |
|---|---|---|
| 475 297 A2 | 4/1992 | (EP) . |
| 5-91584 | 4/1993 | (JP) . |

OTHER PUBLICATIONS

Patent Abstracts of Japan, Pulbication No. 05091584, Date of Publication Apr. 9, 1993.
WPI Abstract of JP8317034.
WPI Abstract of JP9149460.
WO 97/29582, International Publication Date Aug. 14, 1997.

* cited by examiner

*Primary Examiner*—Nay Maung
(74) *Attorney, Agent, or Firm*—Pearne & Gordon LLP

(57) ABSTRACT

A microcomputer is provided in an earphone-microphone device for the purpose of controlling the transmission/receipt of data with respect to a portable cellular phone by way of a serial data signal line and a serial clock signal line, the operation of a liquid crystal device driver, and the operation of a drive circuit of a vibrator. As a result, an earphone-microphone device itself can perform typical functions of the cellular phone, such as retrieval of phone-number-related data stored in the cellular phone, displaying of the thus-retrieved data, origination of a call to the called party indicated on a display, and actuation of the vibrator when there is an arrival of an incoming call.

4 Claims, 2 Drawing Sheets

MULTIFUNCTION EARPHONE-MICROPHONE DEVICE

BACKGBOUND OF THE INVENTION

1. Field of the Invention

The present invention relates to a multifunction earphone-microphone device for use with a portable cellular phone.

2. Description of the Related Art

An earphone-microphone device disclosed in Unexamined Japanese Patent Publication (kokai) No. Hei-5-91584 has already been known as a conventional sarphone-microphone device for use with a portable cellular phone. FIG. 3 shows the configuration of a conventional earphone-microphone device. the earphone-microphone device has a four-pole plug 11b as an interface section 1, a microphone 21 and a push switch 23b as a display/operation section 2, and earphone 31 as a receiving section 3.

FIG. 4 shows a wiring diagram of the earphone-microphone device shown in FIG. 3. The earphone/microphone device is connected to a portable cellular phone (not shown) by way of a four-electrode plug 11b. When the earphone/microphone device is connected to the portable cellular phone, voice entered from a microphone 21 is fed to the portable cellular phone by way of a microphone signal plug 12. In contrast, received voice is output from an earphone 31 of the earphone-microphone device by way of a received signal plug 13. Further, a push switch 23b is connected to a circuit provided in the portable cellular phone by way of a switch detector plug 18. Accordingly, the portable cellular phone is capable of detecting the pushing action of the push switch. Further, the origination of a call to, or receipt of an incoming call from, a specific called party can be effected through use of the push switch 23b. Reference numeral 17 designates a ground terminal.

However, the aforementioned conventional earphone-microphone suffers several problems. For example, when the portable cellular phone is kept in a bag, the user cannot know a calling party without seeing a liquid crystal display (LCD) of a portable cellular phone every time there is an arrival of an incoming call. Further, when a vibrator is set to an ON state, the user can not realize the arrival of an incoming call unless he carries the portable cellular phone in his pocket or the like.

SUMMARY OF THE INVENTION

The present invention is intended to solve the foregoing problem, and the object of the invention is to enable a multifunction earphone-microphone to perform most typical functions of a portable cellular phone by retrieving phone-number-related data stored in the cellular phone and displaying the thus-retrieved phone-number-related data onto a display/operation section at the time of origination of a call, or by actuation of a vibrator provided in thei operation section at the time of arrival of an incoming call.

In order to accomplish the foregoing object, there is provided a multifunction earphone-microphone device comprising:

an interface to be connected to a portable cellular phone; and a display/operation section including a rotary jog dial, wherein phone-number-related data sets, each including the name and telephone number of a called party and the like stored in the portable cellular phone beforehand, are subsequently displayed on the display/operation section when the rotary jog dial is rotated while the interface is connected to the portable cellular phone. Further, when the portable cellular phone receives an incoming call, a vibrator may be actuated to indicate the incoming call.

According to the present invention, since a phone-number-related data set of a called party is displayed on the display/operation section at the time of origination of a call, it is possible to make a call by only pressing the rotary jog dial. Furtherr when there is an arrival of an incoming call, the user can know the arrival of a call from vibration of the vibrator of the display/operation section.

BRIEF DESCRIPTLsQN OF THE DRAWINGS

PREFERRED EMBODIMENT OF THE INVENTION

Preferred embodiment according to the present invention will be described referring to the accompanying drawings as follows.

Figure 1:
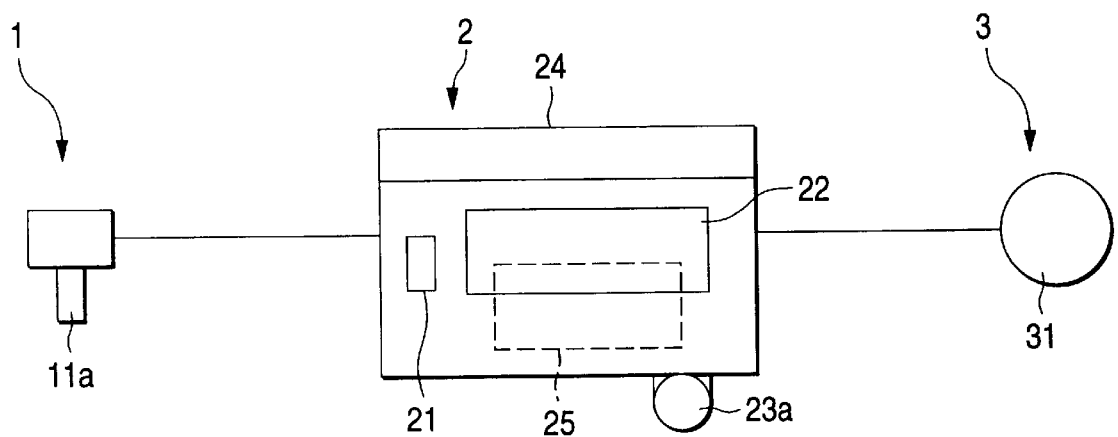
FIG. 1 is a block diagram showing a multifunction earphone-microphone device according to one embodiment of the present invention.

As shown in the diagram of a multifunction earphone-microphone device provided in FIG. 1, a multifunction earphone-microphone device according to the present invention has a rotary jog dial 23a and a diaplay/operation section 2. Called parties stored in memory dial are displayed subsequentially on the display/operation section 2 through use of the rotary jog dial 23a. A call can be made by pressing the rotary jog dial 23a after confirming a desired called party on the display/operation section. Further, the display/operation section 2 of the earphone-microphone device has a built-in vibrator 24. When there is an arrival of an incoming call, the vibrator 24 is actuated under control of a microcomputer 25. Therefore, the present invention is possible to provide a superior multifunction earphone-microphone device capable of indicating the arrival of an incioming call even when the user does not carry the portable cellular phone.

Figure 2:
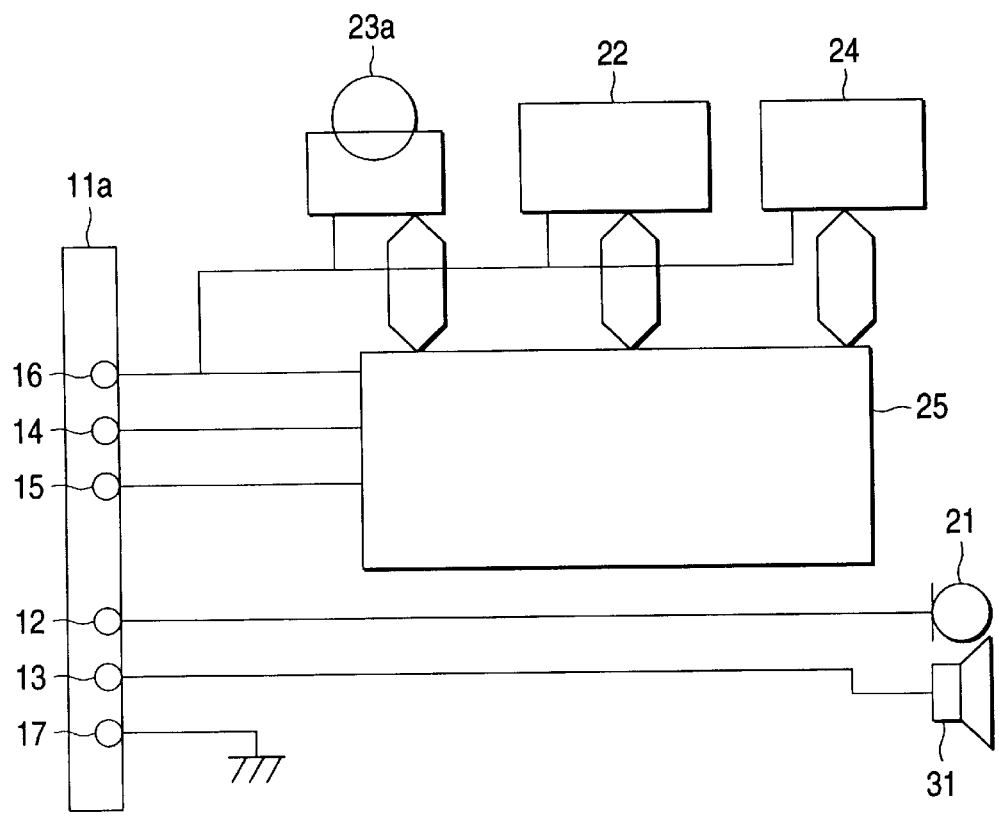
FIG. 2 is a wiring diagram showing the multifunction earphone-microphone device shown in FIG. 1.
Figure 3:
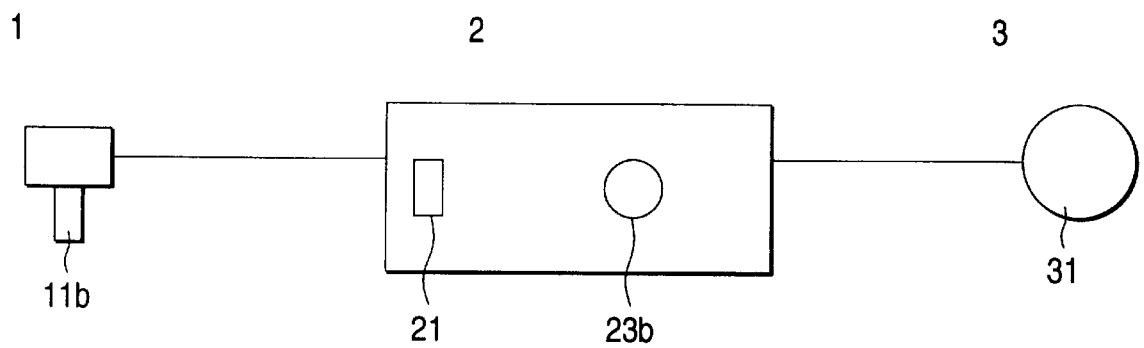
FIG. 3 is a block diagram showing an existing earphone-microphone device.
Figure 4:
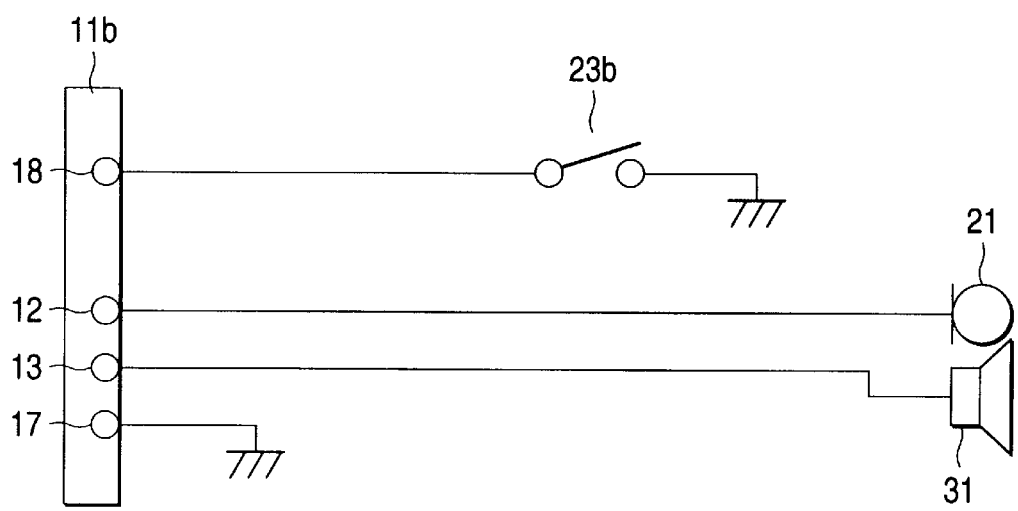
FIG. 4 is a wiring diagram showing the earphone-microphone device shown in FIG. 3.

FIG. 1 is a block diagram showing a multifunction earphone-microphone device according to an embodiment of the present invention, and FIG. 2 is a wiring diagram showing the multifunction earphone-microphone device shown in FIG. 1.

In FIGS. 1 and 2, an interface 1 sends a signal to or receives a signal from a portable cellular phone and has a six-pole plug 11a. The plug has a microphone signal terminal 12, a receiver signal terminal 13, a serial data signal terminal 14, a serial clock signal terminal 15, a power signal terminal 16, and a ground terminal 17. A display/operation section 2 has a microphone 21, a liquid crystal display 22, a rotary jog dial 23a, a vibrator 24, and a microcomputer 25. The receiver 3 is formed of an earphone 31.

With reference to FIG. 2, the operation of the multifunction earphone-microphone device having the foregoing configuration will now be described. The interface 1 of the multifunction earphone-microphone device is connected to a portable cellar phone (not shown). In this state, the power source of the portable cellular phone is turned on, and the thus-activated cellular phone is held in a bag or the like.

When an attempt is made to originate a call to a specific called party, phone-number-related data sets registered in the cellular phone beforehand, each set including such as the name and telephone number of a called party, are sent to the interface 1. The thus-recelired data sets are displayed subsequentially on a liquid crystal display 22 of the display/operation section 2. A call can be made by pressing the rotary jog dial 23 a while a desired called party is on the display.

The microcomputer 25 provided in the multifunction earphone-microphone device controls the displaying action and other operations of the multifunction earphone-microphone device. By way of a pair of transmit/receive data signal lines, such as the serial data signal terminal 14 and the serial clock signal terminal 15, the microcomputer 25 sends data to or receives data from a microcomputer of the cellular phone and instructs the transmission/receipt of display data or the actuation of the vibrator.

Table 1 shows a comparison between the characteristics of the multifunction earphone-microphone device according to the present embodiment of the present invention and those of the existing earphone-microphone device.

As is apparent from Table 1, the multifunction earphone-microphone device according to the present embodiment is capable of originating a call by displaying a desired called party through utilization of the rotary jog dial and by pressing the switch. Alternatively, so long as the push switch is replaced with a rotary jog dial and the earphone-microphone device is provided with a liquid crystal device for displaying a stored phone number, a call to a specific called party can be made.

TABLE 1

| | Conventional Earphone Microphone Device | Multifunctional Earphone Microphone Device of the Invention |
| --- | --- | --- |
| Inter face Section | (1)Four-pole Plug (2)Microphone Signal Terminal (3)Receiver Signal Terminal (4)Switch Signal Terminal (5)GND | (1)Six-pole Plug (2)Microphone Signal Terminal (3)Receiver Signal Terminal (4)Serial Data Terminal (5)Serial Clock Terminal (6)Power Signal Terminal (7)GND |
| Display/ Operation Section | (1)Microphone (2)No Display (3)Only Push Switch | (1)Microphone (2)Liquid Crystal Display (3)Rotary Jog Dial (4)Vibrator (5)Microcomputer |
| Receiver Section | (1)Earphone | (1)Earphone |

Next, the arrival/incoming call operation of the earphone/microphone device will be described. In FIG. 1, the display/operation section 2 performs origination or receipt of a call.

First, the vibrator 24 is set to an ON state through use of the rotary jog dial 23a. In this state, when the cellular phone receives an incoming call, the vibrator 24 in the display/operation section 2 causes vibrations, enabling indication of arrival of an incoming call even when the cellular phone is kept away from the user, e.g., when the phone is held in a bag.

As mentioned previously, according to the present embodiment; since the multifunction earphone-microphone device has a built-in vibrator, it is possible to indicate an arrival of an incoming call even when the portable cellular phone is kept away from the user, e.g., when it is held in a bag.

As has been described above, in the present invention, an earphone-microphone device is provided with a rotary jog dial, a display/operation section, and a vibrator. Such an earphone-microphone device is capable of retrieving and displaying a phone number stored in a portable cellular phone, as well as of dialing the thus-retrieved phone number. When there is an arrival of an inlcoming call, the vibrator is actuated. Accordingly, the multifunction earphone-microphone device has the advantage of performing most typical functions of the portable cellular phone.

What is claimed is:

1. A multifunction earphone-microphone device comprising:

an interface, said interface comprising a plug that is adapted for connection to, and disconnection from, a portable cellular phone; and a display/operation section including a rotary jog dial, said display/operation section being operable to display a phone-number-related data set that is stored in the portable cellular phone, said phone-number-related data set being communicated to the display via the interface while said interface is connected to the portable cellular phone.

2. A multifunction earphone-microphone device according to claim 1, wherein the display/operation section includes a vibrator, and when the portable cellular phone receives an incoming call, a signal is communicated to the vibrator via the interface to to actuate the vibrator and thereby indicate the incoming call to a user.

3. A multifunction earphone-microphone device according to claim 1, wherein the phone-number-related data set includes at least name and phone number.

4. A multifunction earphone-microphone device according to claim 1, further comprising a receiver that receives signals via the interface from the portable cellular phone.

* * * * *